United States Patent
Cheng et al.

(10) Patent No.: US 7,847,808 B2
(45) Date of Patent: Dec. 7, 2010

(54) PHOTOGRAPHIC MAPPING IN A SIMULATION

(75) Inventors: YuChiang Cheng, San Francisco, CA (US); Chad M. Nelson, Oakland, CA (US); David Castelnuovo, San Francisco, CA (US)

(73) Assignee: World Golf Tour, Inc., San Francisco, CA (US)

( * ) Notice: Subject to any disclaimer, the term of this patent is extended or adjusted under 35 U.S.C. 154(b) by 0 days.

(21) Appl. No.: 11/779,787

(22) Filed: Jul. 18, 2007

(65) Prior Publication Data

US 2008/0018667 A1 Jan. 24, 2008

Related U.S. Application Data

(60) Provisional application No. 60/832,047, filed on Jul. 19, 2006.

(51) Int. Cl.
G09G 5/00 (2006.01)
(52) U.S. Cl. .................. 345/634; 345/633; 345/632; 463/3; 463/4
(58) Field of Classification Search .......... 345/633, 345/632, 629
See application file for complete search history.

(56) References Cited

U.S. PATENT DOCUMENTS

| | | | | |
|---|---|---|---|---|
| 5,423,554 | A * | 6/1995 | Davis | 463/4 |
| 6,166,744 | A * | 12/2000 | Jaszlics et al. | 345/629 |
| 6,282,362 | B1 * | 8/2001 | Murphy et al. | 386/46 |
| 6,396,537 | B1 * | 5/2002 | Squilla et al. | 348/239 |
| 6,504,571 | B1 * | 1/2003 | Narayanaswami et al. | 348/231.99 |
| 6,611,266 | B1 * | 8/2003 | Pollack et al. | 345/427 |
| 6,741,864 | B2 * | 5/2004 | Wilcock et al. | 455/456.1 |
| 7,084,876 | B1 * | 8/2006 | Fogel et al. | 345/473 |
| 7,214,133 | B2 * | 5/2007 | Jen et al. | 463/42 |
| 2001/0008840 | A1 * | 7/2001 | Sugimoto | 463/2 |
| 2001/0011035 | A1 * | 8/2001 | Sugimoto | 463/3 |
| 2002/0161461 | A1 * | 10/2002 | Lobb et al. | 700/91 |
| 2002/0187831 | A1 * | 12/2002 | Arikawa et al. | 463/32 |
| 2002/0196263 | A1 * | 12/2002 | Muramori et al. | 345/582 |
| 2003/0078086 | A1 * | 4/2003 | Matsuyama et al. | 463/3 |
| 2003/0087652 | A1 * | 5/2003 | Simon et al. | 455/466 |
| 2004/0110565 | A1 * | 6/2004 | Levesque | 463/42 |
| 2005/0012740 | A1 * | 1/2005 | Takahashi et al. | 345/419 |

(Continued)

FOREIGN PATENT DOCUMENTS

EP 0 473 310 A2 3/1992

(Continued)

OTHER PUBLICATIONS

"3D projection", retrieved on Oct. 1, 2008 from http://en.wikipedia.org/wiki/3d_projection, 3 pages.

(Continued)

Primary Examiner—Michelle K Lay
(74) Attorney, Agent, or Firm—Innovation Counsel LLP

(57) ABSTRACT

Methods and apparatus, including computer program products, for determining a location for a virtual object on a course terrain for a course. A photographic image of the course corresponding to the location is identified. The virtual object is incorporated in a presentation of the photographic image such that the virtual object appears in the photographic image.

18 Claims, 12 Drawing Sheets

U.S. PATENT DOCUMENTS

| | | | |
|---|---|---|---|
| 2005/0153785 A1* | 7/2005 | Sun | 473/151 |
| 2005/0286759 A1* | 12/2005 | Zitnick et al. | 382/154 |
| 2006/0038833 A1* | 2/2006 | Mallinson et al. | 345/633 |
| 2006/0055711 A1* | 3/2006 | Hayakawa | 345/629 |
| 2006/0128468 A1* | 6/2006 | Yoshikawa et al. | 463/36 |
| 2006/0223635 A1* | 10/2006 | Rosenberg | 463/37 |
| 2008/0291216 A1 | 11/2008 | Cheng | |
| 2008/0291220 A1 | 11/2008 | Cheng | |
| 2008/0293464 A1 | 11/2008 | Cheng | |
| 2008/0293488 A1 | 11/2008 | Cheng | |

FOREIGN PATENT DOCUMENTS

| | | | |
|---|---|---|---|
| JP | 2003079950 A | * | 3/2003 |

OTHER PUBLICATIONS

"3D viewing: Introduction: The Three Stages of the Viewing Transformation", retrieved on Dec. 2, 2008 from http://www.comp.brad.ac.uk/research/GIP/tutorials/intro.html, 1 page.

"Calculating the Viewing Transformation", retrieved on Oct. 1, 2008 from http://www.comp.brad.ac.uk/research/GIP/tutorials/vtrans.html, 1 page.

"Photo Tourism: Exploring Photo Collections in 3D", Online Submission ID: 0184, 11 pages.

"Putting it all Together", retrieved on Oct. 1, 2008 from http://www.comp.brad.ac.uk/research/GIP/tutorials/concat.html, 1 page.

"Summary", retrieved on Oct. 1, 2008 from http://www.comp.brad.ac.uk/research/GIP/tutorials/summary.html, 1 page.

"The Projection Transformation", retrieved on Oct. 1, 2008 from http://www.comp.brad.ac.uk/research/GIP/tutorials/vtrans2.html, 2 pages.

"The Transformation to the view coordinate system", retrieved on Oct. 1, 2008 from http://www.comp.brad.ac.uk/research/GIP/tutorials/vtrans1.html, 2 pages.

"The Definition of the Viewpoint", retrieved on Oct. 1, 2008 from http://www.comp.brad.ac.uk/research/GIP/tutorials/viewp.html, 1 page.

AboutGolf [driving.technology], 2006, 15 pages.

Bearman, P., et al., "Golf Ball Aerodynamics," Aeronautical Quarterly 27, 1976, pp. 112-122.

Cochran, A. and J. Stobbs. Search for the Perfect Swing. Chicago: Triumph, 1999.

Domenech, A. "A classical experiment revisited: The bounce of balls and superballs in three dimensions," American Journal of Physics 73, 2005, pp. 28-36.

Freewebs, "How does it work?", retrieved from http://www.fotowoosh.com/index.html/, 1 page.

Full Swing Golf, retrieved from http://www.fullswinggolf.com, 1 page.

Holmes, B. "Dialogue concerning the Stimpmeter," The Physics Teacher 24, 1986, pp. 401-404.

Holmes, B. "Putting: How a golf ball and hole interact," American Journal of Physics 59, 1991, pp. 129-136.

International Search Report in corresponding PCT app #PCT/US07/73887 dated Sep. 3, 2008.

Jorgensen, T. The Physics of Golf. New York: Springer, 1994.

Milne, R., et al. "The role of the shaft in the golf swing," Journal of Biomechanics 25, 1992, pp. 975-983.

Mirtich, B.V. "Impulse Based Dynamic Simulation of Rigid Body Systems" (PhD dissertation, University of California at Berkeley, 1996).

Naimark, "A 3D Moviemap and a 3D Panorama", 15 pages, http:www.naimark.net/writing/spie97.html, 1997.

Naimark, "Place Runs Deep: Virtuality, Place and Indigenousness", 4 pages, http:www.naimark.net/writing/salzberg.html.

Partial International Search Report in PCT app # PCT/US2008/064360 dated Oct. 9, 2008.

Pebble Beach Golf Links, retrieved on Oct. 1, 2008 from http://www.deadsolidgolf.com/pebblebeachpage.html, 3 pages.

Penner, A.R. "The physics of golf," Reports on Progress in Physics 66, 2003, pp. 131-171.

Penner, A.R. "The physics of golf: The convex face of a driver," American Journal of Physics 69, 2001, pp. 1073-1081.

Penner, A.R. "The physics of golf: The optimum loft of a driver," American Journal of Physics 69, 2001, pp. 563-568.

Penner, A.R. "The physics of putting," Canadian Journal of Physics 80, 2002, pp. 83-96.

Penner, A.R. "The run of a golf ball," Canadian Journal of Physics 80, 2002, pp. 931-940.

Shelquist, Richard. "Air Density and Density Altitude.", 2006, 21 pages. http://wahiduddin.net/calc/density_altitude.htm.

Szeliski, R., "Photo Tourism: Exploring Photo Collections in 3D", retrieved on Dec. 2, 2008 from http://research.microsoft.com/IVM/PhotoTours/, 2 pages.

Ugural, et al., "Advanced Strength and Applied Elasticity", 1995, 23 pages.

Werner, F. and R. Greig. How Golf Clubs Really Work and How to Optimize Their Designs. Jackson: Origin Inc., 2000.

Wishon, T. The Search for the Perfect Golf Club. Ann Arbor: Sports Media Group, 2005.

* cited by examiner

PHOTOGRAPHIC MAPPING IN A SIMULATION

CROSS REFERENCE TO RELATED APPLICATIONS

This application claims priority to U.S. Provisional Patent Application No. 60/832,047, entitled "Photographic Mapping in a Simulation", to YuChiang Cheng, et al., which was filed on Jul. 19, 2006; the disclosure of the prior application is considered part of (and is incorporated by reference in) the disclosure of this application. This application is related to pending U.S. application Ser. No. 11/407,163, entitled "Automatically Adapting Virtual Equipment Model," filed on Apr. 18, 2006, the entire contents of which are hereby incorporated by reference.

BACKGROUND

The present disclosure relates to using photographs in computer simulations.

Computer games and other types of simulations recreate real world environments such as baseball diamonds, race tracks, and golf courses through three dimensional (3D) computer generated graphics. However, such graphics can typically create unnatural visual artifacts such as repeating patterns which detract from the intended realism of the imagery. Some computer games may use a photograph of an actual location as a background, such as a mountains, with computer generated graphics rendered in the foreground. However, there may not be any interaction between the computer generated graphics and the terrain represented by the photograph.

SUMMARY

In general, in one aspect, embodiments of the invention feature determining a location for a virtual object on a course terrain for a course. A photographic image of the course corresponding to the location is identified. The virtual object is incorporated in a presentation of the photographic image such that the virtual object appears in the photographic image at a second location corresponding to the first location.

These and other embodiments can optionally include one or more of the following features. Interaction of the virtual object with one or more portions of the course terrain can be simulated. A visual representation of the interaction can be incorporated into the presentation of the first photographic image. The photographic image can be pre-fetched based on a history associated with a user or a group of users. User input can be accepted to cause interaction of the virtual object with one or more portions of the course terrain. In response to movement of the virtual object: a second location for a virtual object on a course terrain for a course can be determined; a second photographic image of the course corresponding to the second location can be identified; and the virtual object can be incorporated in a presentation of the second photographic image. The course terrain can be mapped to the photographic image. The location can be a real-world location on the course.

An avatar or a piece of virtual equipment can be incorporated into the presentation of the photographic image. The virtual object can be incorporated in a presentation of the photographic image such that the virtual object is animated in the photographic image. A visual effect can be incorporated into the presentation of the photographic image. The course can be one or more of: a golf course, a baseball diamond, a track, a tennis court, one or more roadways, or open terrain.

The virtual object can be one of: a golf ball, a baseball, a tennis ball, an automobile, a bicycle, an animal, an avatar, a motorcycle, or a flying craft. The photographic image can be a composition of two or more photographs of the course. A photograph can be identified from a plurality of photographs where a target location is nearest to the horizontal center of the photograph. The terrain can be altered to account for distortion in the photographic image. The virtual object can be scaled in the presentation of the photographic image. The location can be projected in a three dimensional space to the second location in a two dimensional space.

In general, in another aspect, embodiments of the invention feature determining one or more potential locations for a virtual object on a course terrain for a course, the potential location based on a user history. A photographic image of the course corresponding to each potential location is identified. Each of the identified photographic images is obtained.

These and other embodiments can optionally include one or more of the following features. The virtual object can be incorporated in a presentation of one of the obtained photographic images.

In general, in another aspect, embodiments of the invention feature dividing a course into cells. A target point for the course are determined. Camera parameters for each cell are determined based on a size of the cell and the target point.

These and other embodiments can optionally include one or more of the following features. A shot list can be generated based on the determined camera parameters. Cell density can be altered based on course features.

Particular embodiments of the invention can be implemented to realize one or more of the following advantages. Players can be provided the experience of playing on a real course because of the integration of actual photographs of the course into the game play. Photographs can be pre-fetched based on one or more player's history to improve the performance of the game or simulation. Virtual objects can be integrated at the proper location and with the proper scale into actual photographs such that the player has the impression the virtual objects were actually photographed on the course. A course can be manually or automatically be divided into a grid of potentially varying density and a shot list can be automatically generated for the grid.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Various implementations recreate the experience of playing on a course (e.g., a golf course, a baseball diamond, a race track) utilizing actual photographs of the course combined with simulated two dimensional (2D) and 3D graphics.

Computer games and other types of simulations typically include a virtual universe that players interact with in order to achieve one or more goals, such as shooting all of the "bad" guys or playing a hole of golf. Typical computer game genres include role-playing, first person shooter, third person shooter, sports, racing, fighting, action, strategy, and simulation. A computer game can incorporate a combination of two or more genres. Computer games are commonly available for different computer platforms such as workstations, personal computers, game consoles (e.g., Sony PlayStation and PlayStation Portable, Microsoft Xbox, Nintendo GameCube and Game Boy), cellular telephones, portable media players, and other mobile devices. Computer games can be single player or multi-player. Some multiplayer games allow players connected via the Internet to interact in a common or shared virtual universe.

A virtual universe is the paradigm with which the user interacts when playing a computer game and can include representations of virtual environments, objects, characters, and associated state information. For instance, a virtual universe can include a virtual golf course, golfers, golf clubs and golf balls. A virtual universe and its virtual objects can change as users achieve goals. For example, in action games as users advance to higher game levels, typically the virtual universe is changed to model the new level and users are furnished with different virtual equipment, such as more powerful weapons.

Players typically interact with one or more virtual objects in a virtual universe, such as an avatar and virtual equipment, through a user interface. A user interface can accept input from all manner of input devices including, but not limited to, devices capable of receiving mouse input, trackball input, button presses, verbal commands, sounds, gestures, eye movements, body movements, brain waves, other types of physiological sensors, and combinations of these. A click of a mouse button, for example, might cause a virtual golf club to swing and strike a virtual golf ball on a virtual golf course.

Figure 1A:
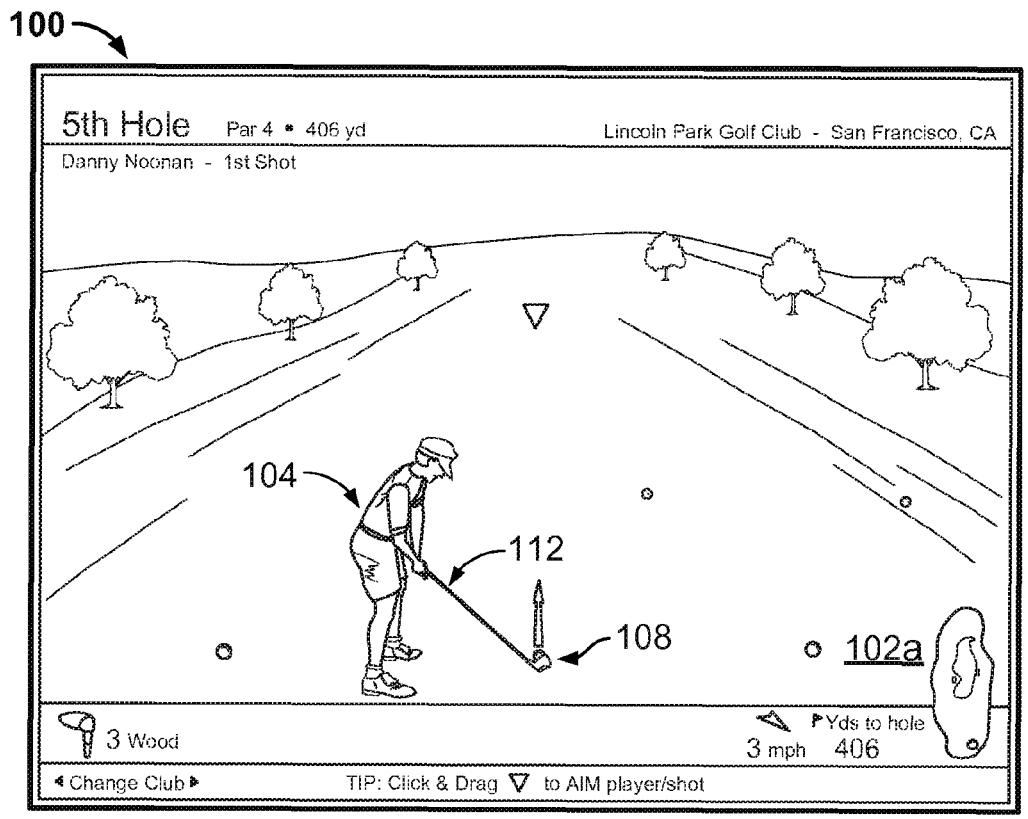
FIGS. 1A-C illustrates a graphical user interface for a computer golf game that incorporates photographs of an actual golf course into the game play.

FIG. 1A illustrates a graphical user interface (GUI) 100 for a computer golf game that incorporates photographs of an actual golf course (e.g., 102a) into the game play. Various visual representations of virtual objects have been integrated into the presentation of the photograph 102a, including an avatar 104 representing the player, a piece of virtual equipment 112 representing a golf club, and a piece of virtual equipment 108 representing a golf ball. The player provides user input to the computer game which reacts by altering the state of the game's virtual universe based on the input and interaction of virtual objects in the virtual universe.

For example, player input can cause the avatar 104 to appear to hit the ball 108 with the club 112 towards the end of the green. A game engine can simulate the physics of the ball 108's aerial trajectory and eventual interaction with (e.g., bouncing and rolling) a golf course terrain in the virtual universe that represents the golf course. The terrain can be a model of the topography of an actual golf course, for example. As will be described below, the new location of the ball 108 in the 3D virtual golf course and, optionally, other virtual objects, are mapped to corresponding 2D locations in the photograph 102a, or a different photograph, so that the virtual objects appear in the proper place, and at the proper scale, in the photograph as though they were actually photographed. In this way, the player is provided the experience of playing on an actual golf course.

Figure 2A:
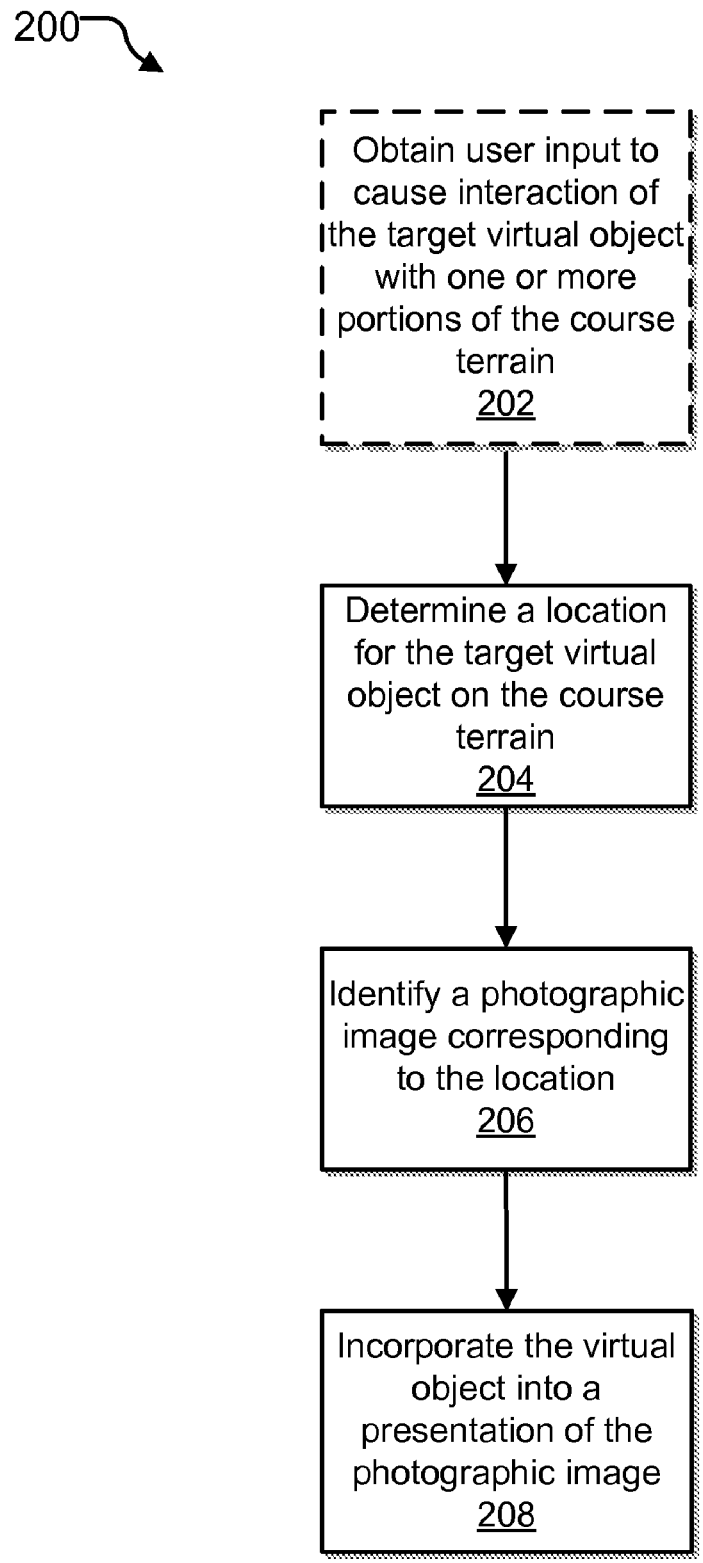
FIG. 2A is a flow diagram of a technique for photographic mapping in a simulation such as a computer game.

FIG. 2A is a flow diagram 200 of a technique for photographic mapping in a simulation such as a computer game. User input is optionally obtained which causes a virtual object (e.g., golf ball 108) that is being tracked for purposes of triggering photographic mapping to interact with one or more portions of a 3D course terrain to be simulated (step 202). More than one virtual object can be tracked. Based on the simulation, a new location for the virtual object(s) on the course terrain is determined (step 204). For example, a game engine can simulate the physics of a golf ball trajectory and the ball's eventual impact with a golf course terrain.

A photographic image corresponding to the virtual object's new location on the course is identified (step 206). If there is more than one virtual object being tracked, photograph corresponding to an area of the terrain encompassing the location of all of the tracked virtual objects is identified. In one implementation, where there are multiple photographs covering a given course location, the photograph that provides the best view from the player's perspective is chosen. For example, a photograph which is closest to centering on the location of the virtual object's new location would be chosen. Alternatively, more than one photograph of the virtual object's new location can be digitally stitched together to form a single, composite photograph. The virtual object(s) are incorporated into the photographic image (e.g., using 3D mapping; step 208).

Figure 2B:
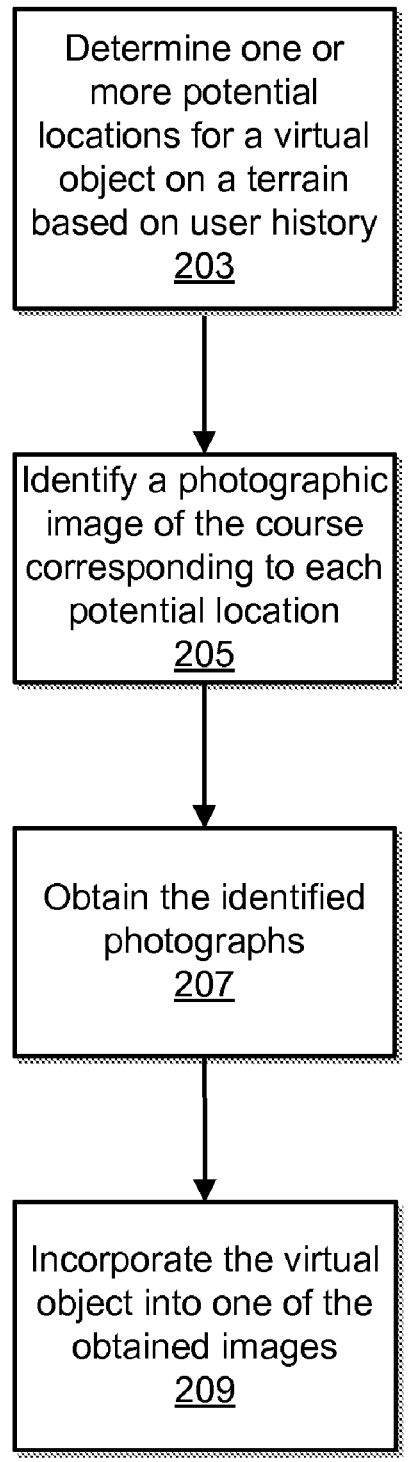
FIG. 2B is a flow diagram of a technique for pre-fetching photographic images for mapping in a simulation such as a computer game.

FIG. 2B is a flow diagram 201 of a technique for pre-fetching photographic images for mapping in a simulation such as a computer game. Pre-fetching photographic images can improve performance of real-time games and other simulations by caching photographs ahead of time before they need to be presented. This is especially true if the images must be retrieved from remote storage. First, one or more potential locations for a virtual object on a course terrain are determined based on a user's playing history or on the playing history of a group of users for that particular part of the course (step 203). Playing history can include information identifying past locations of virtual objects in the terrain for the user(s) and measures of the user(s)' game playing abilities. A photographic image of the course corresponding to each potential location is then identified (step 205). The identified photographs are then pre-fetched (e.g., cached) so as to be ready for possible incorporation into the game play (step 207). One or more virtual objects are then incorporated into one of the obtained images (step 209) based on the new location of the virtual object.

Figure 1B:
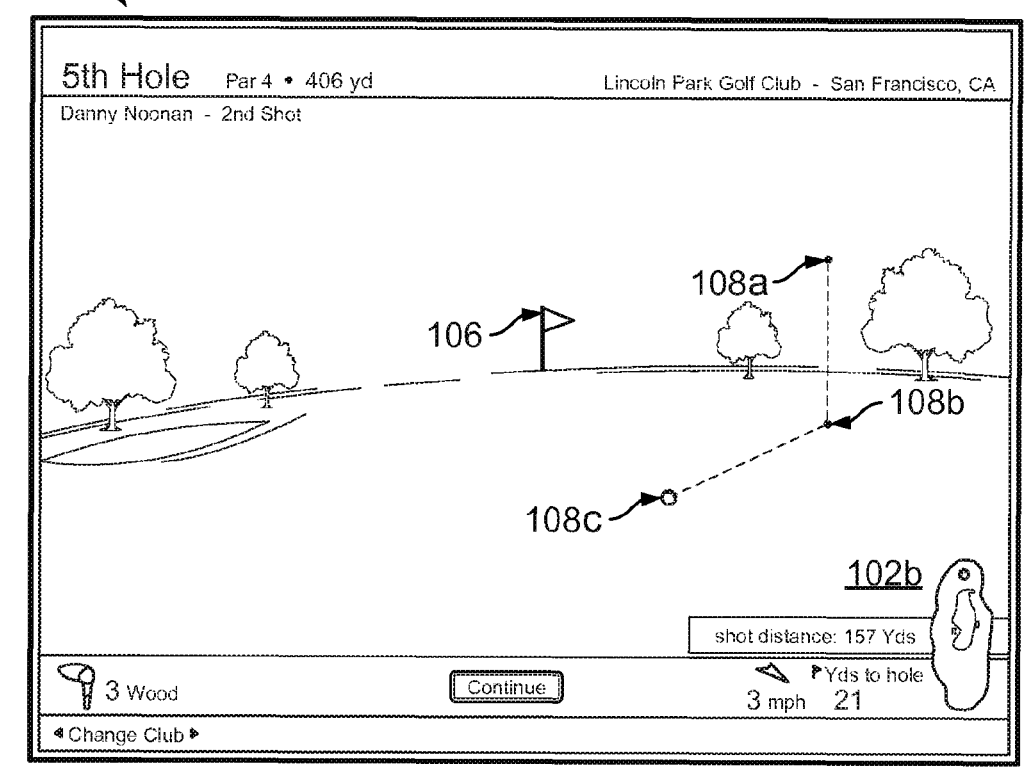

Some or all of a tracked virtual object's simulated movement in the virtual universe can also be animated in an actual course photograph. For example, after the player strikes the golf ball 108 in photograph 102a (as shown in FIG. 1A), photograph 102b (as shown in FIG. 1B) can be presented to the player along with animation of the ball 108 falling from the sky at location 108*a*, impacting the golf course at location 108*b*, and rolling to resting location 108*c*. If the ball 108 were to continue rolling beyond the edge of the photograph 102*b*, a new photograph corresponding to the ball 108's new location could be displayed. This can continue until the ball 108 comes to rest. Alternatively, only the last such photograph (i.e., the photograph of the virtual object's resting place) need be presented. Visual representations of other virtual objects can also be animated in the photograph 102*a*. For example, the avatar 104 can be animated such that the avatar 104 swings the golf club 112 and reacts to the swing.

Figure 1C:
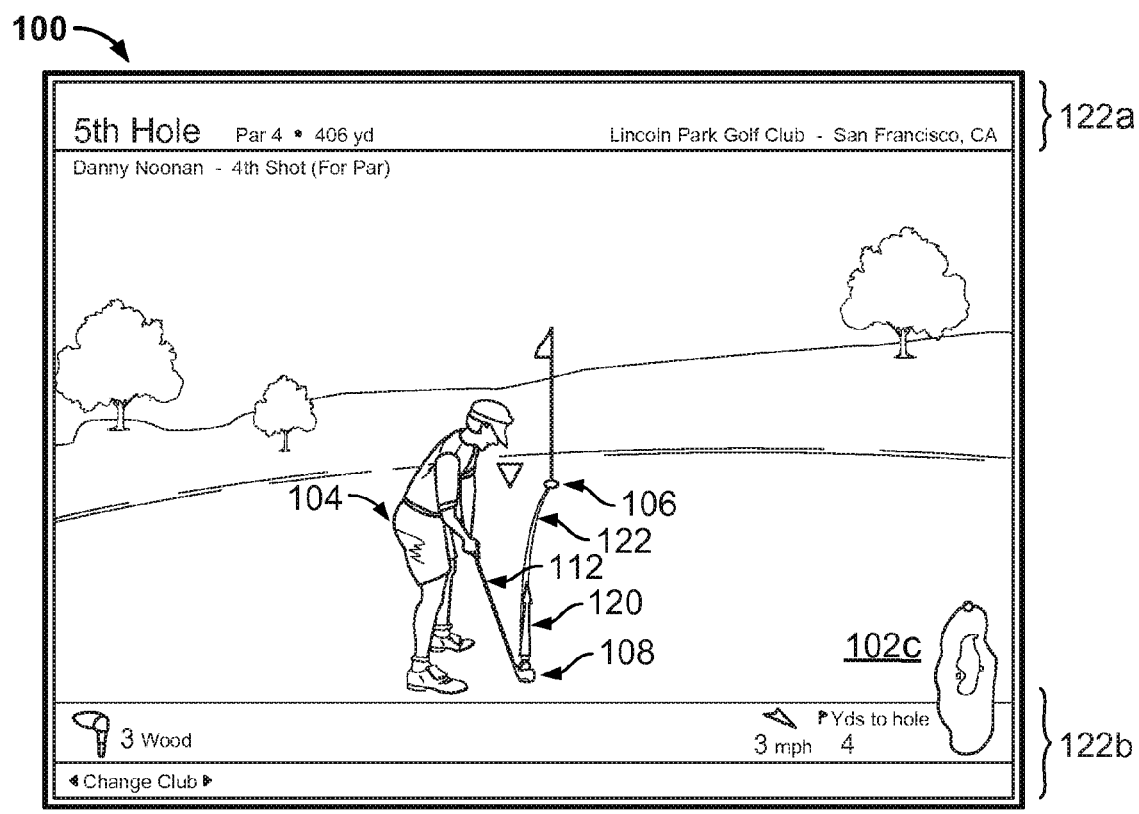

Additional graphical information to help the player can be incorporated into the photograph and the GUI 100. As shown in FIG. 1C, a directional aiming arrow 120 is provided to assist the player in setting up a shot. An animated arc 122 can be drawn on the photograph to show the player the path the golf ball 108 will take in the air and on the course. Alternately, the arc 122 can be drawn as the golf ball 108 moves in the photograph 102*c*. Two status areas 122*a*-*b* are incorporated into the GUI 100 to provide information such as the current location in the virtual course, the player score, distance to the hole or pin 106, wind speed and direction, and the virtual club the player is using.

Figure 3A:
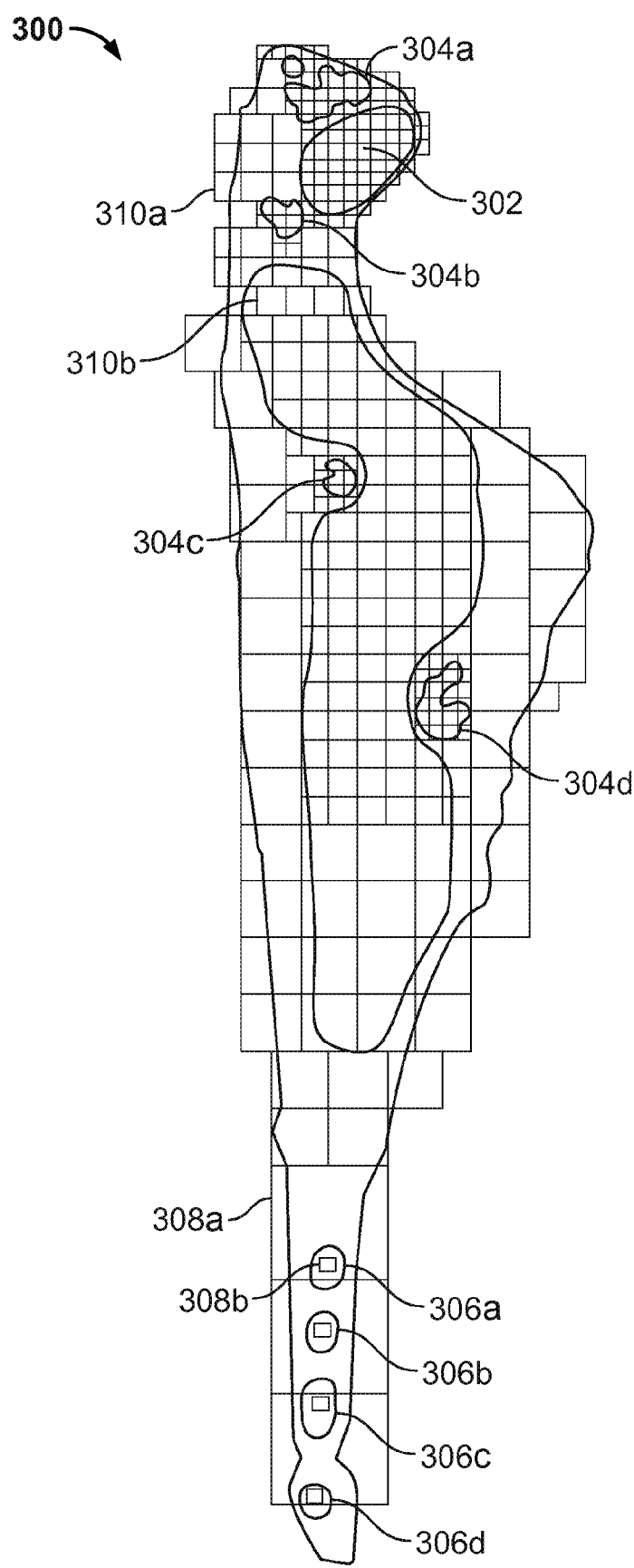
FIG. 3A illustrates a course grid.

In order to systematically photograph an actual course (e.g., a track, a golf course, a baseball diamond, a football field, a tennis court, one or more roadways) for use in computer game or other simulation, the course can be manually or automatically divided into a grid of cells. Each cell defines a physical area of the course that will be photographed for use in the simulation. Each cell can have one or more photographs associated with the cell. In one implementation, a cell is associated with a single photograph which encompasses the area of the course corresponding to the area of the cell. FIG. 3A is an illustration of a golf course 300 so divided. A course can be of any size and shape, and can include non adjacent areas. Likewise, cells can have different sizes, shapes and do not have to be adjacent to one another. Depending on the portion of the course they cover, cell density can change. In one implementation, cell density increases in course areas where players are more likely to interact with virtual objects.

In the world of golf, for example, these areas would be putting greens (e.g., 302), tee boxes (e.g., 306*a*-*d*) and nuances such as sand traps (e.g., 304*a*-*d*) and obstructions such as trees that golfers must circumnavigate. In other areas of the course, cell density is decreased meaning fewer course photographs need to be taken. In one implementation, lower density cell areas have a lower frequency of balls landing in them, require a wider area of visibility for the player, or both. In one implementation, image recognition software can be used to identify such areas of a course based on recognizing certain visible features (e.g., putting greens, sand traps, trees). By identifying areas of a course as having a high or low probability of player interaction, a course can be automatically divided regions having appropriate cell densities.

In one implementation, a course can have more than one layer of cells. The need for this may arise, for instance, to handle situations when a player, due to accident or poor skills, causes a virtual object being tracked for photographic mapping purposes to be located in a part of the course that rarely sees play. In FIG. 3A, small cell 308*b* for tee box 306*a* is the cell used by default for a photograph at this stage of the course since most players are able to hit the ball quite a distance up the fairway. However, some players may cause the ball to land in close proximity to the tee box 306*a*. The area just outside of the tee box 306*a* is not included in the photograph for cell 308*b*. However, secondary cell 308*a* overlaying the default cell 308*b* can be used to obtain a photograph when the ball lies within the bounds of cell 308*a*. The photograph for the secondary cell 308*a* encompasses the tee box 306*a* and the surrounding area. A layer can be chosen based on rules or heuristics that can depend on the state of the virtual universe at a particular point in time. In one implementation, a layer is chosen based on which provides the smallest cell size. In another implementation, a layer can be chosen based on a required style of presentation. For example, it may be desirable to show a ball in flight passing through a cell for dramatic effect.

As discussed above, in one implementation each cell in a course grid is photographed such that the photograph encompasses the area of the course in the cell. For example, the photograph shown in FIG. 3C is of a 25'6"×25'6" cell indicated by the white boundary 301. Two avatars (104*a*-*b*) have been rendered in the photograph to illustrate how the scale of virtual objects change based on their position in the photograph. How this is accomplished is described below. The photograph is taken by a camera at a specified 3D position (longitude, latitude, and altitude) in the actual course. A camera's 3D position can be determined by use of a Global Positioning System (GPS) or a ground based navigation system, for example. Since the position of each cell is known, the camera position can be specified as a setback distance from the cell and a height above the cell. In the photograph of FIG. 3C, the camera is positioned 29'6" away from the cell and a height of 10'3" above the cell. A 24 mm lens was used. FIG. 3D is photograph of a 10'3"×10'3" cell where the camera was positioned at a setback of 12'6" and a height of 5'6", and using a 18 mm lens.

Figure 3B:
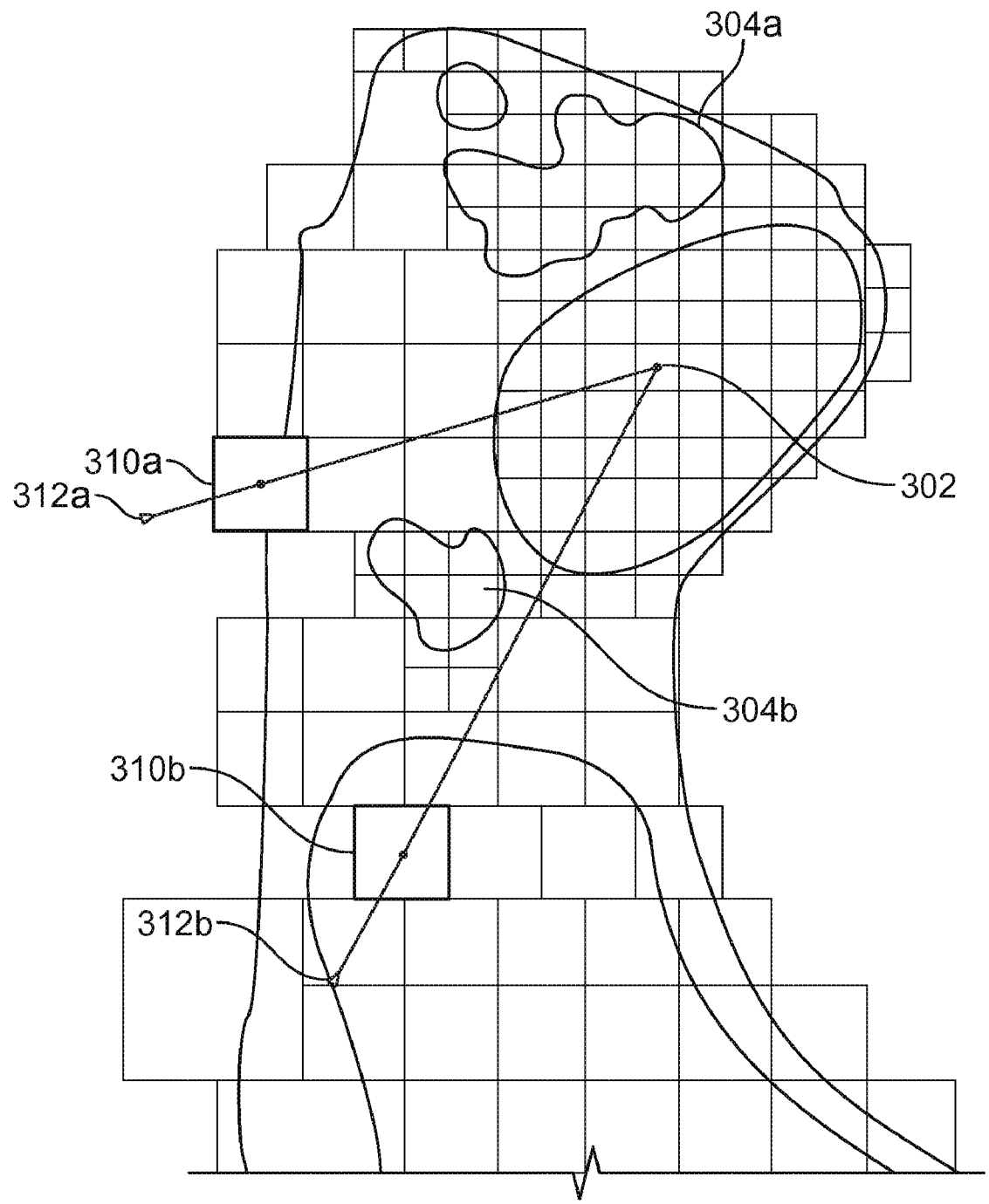
FIG. 3B illustrates how photograph parameters are derived from a cell in a course grid.
Figure 3C:
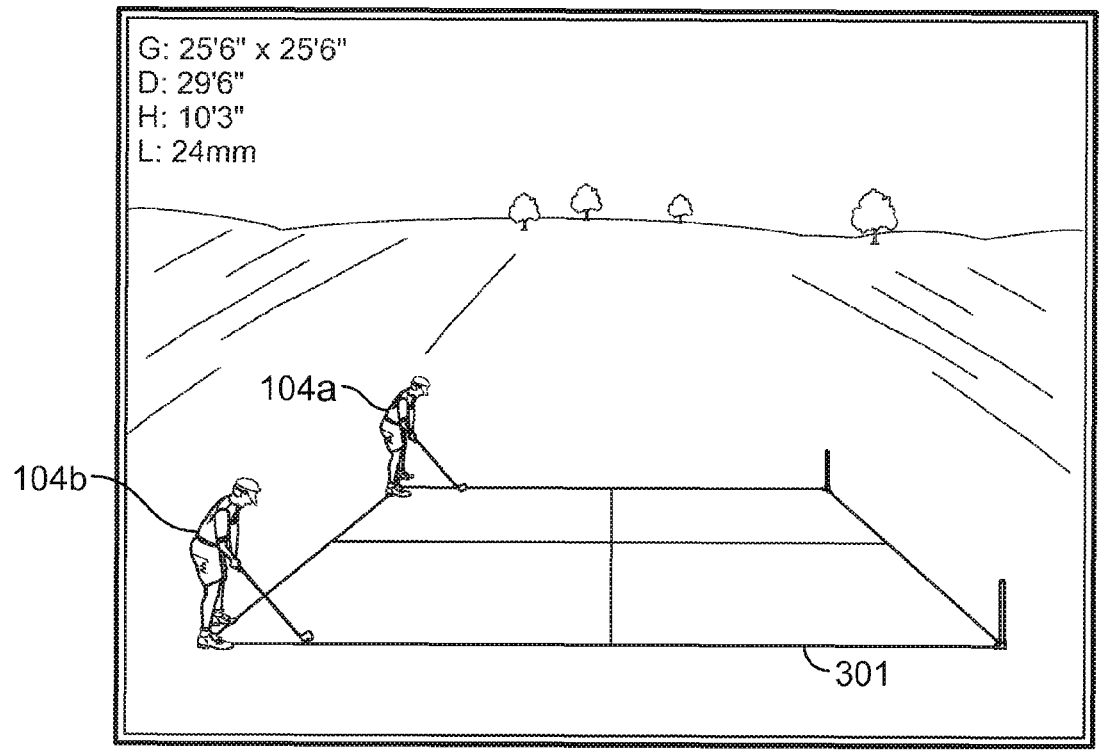
FIG. 3C is an actual course photograph of a 25'6"×25'6" cell.
Figure 3D:
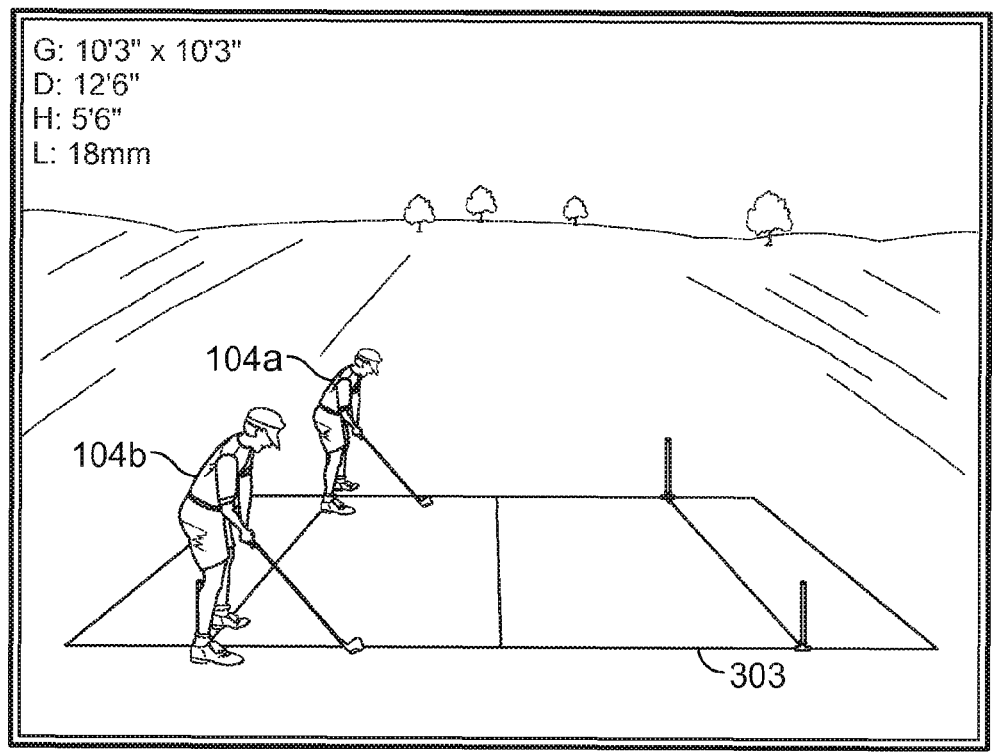
FIG. 3D is an actual course photograph of a 10'3"×10'3" cell.

FIG. 3B is a portion of the course 300 illustrating determination of camera position and direction for a cell. In one implementation, a camera's position and direction can be determined based on a target position for a given cell. In golf, for example, generally the target will be the hole unless the fairway turns such that players must aim for the turn in order to set up a shot for the hole. In this later case, the target would be the turning point in the fairway. The target for cells 310*a* and 310*b* is hole 302. A line passes through the center of each cell to the target. It is along this line that the camera lens will point towards the target. The location of the camera on the course will be along the line and outside of the cell. Cell 310*a*'s camera is located at position 312*a* along the line defined by endpoints 312*a* and 302. Likewise, cell 310*b*'s camera is located at position 312*b* along the line defined by endpoints 312*b* and 302.

In one implementation, the focal length of the lens, the angle of the lens, the offset of the camera from the edge of the cell, and the height of the camera, i.e., the camera parameters, can be predefined for a given cell size. In another implementation, one or more of the focal length, the angle of the lens, and the 3D location of the camera can be dynamically determined. By way of illustration, such a determination can take into account the topology of the cell. If a given cell was in a valley, for instance, it could be beneficial to provide more of an overhead shot so that a player does not lose perspective with the surrounding course area.

Figure 4:
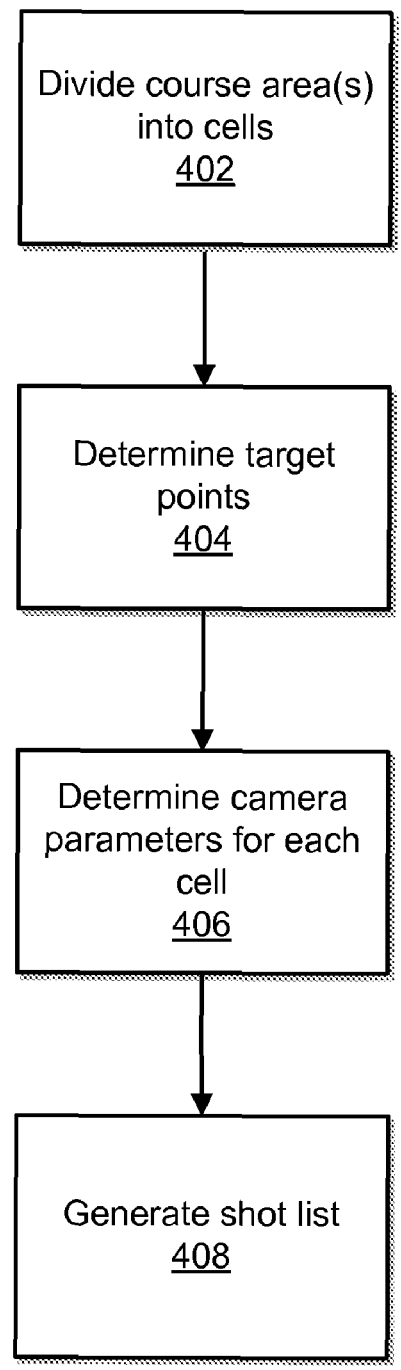
FIG. 4 is a flow diagram illustrating a technique for automatically dividing a course into cells and generating a shot list.

FIG. 4 is a flow diagram illustrating a technique 400 for automatically dividing a course into cells and generating a shot list. Since a course can be automatically divided into cells and since camera parameters for each cell can be automatically determined, a so-called shot list can be automatically determined. A shot list is a list of photographs that need to be taken for cells in a given course. Each shot includes a 3D location of the camera, lens focal length, direction, and angle. A course is initially divided into cells as described above (step 402). One or more target points are determined for the course (e.g., 302; step 404). Camera parameters are determined for each cell based on the target point(s) and/or cell size (step 406). Finally, a shot list is generated describing the camera requirements required to photograph each cell on the course. In a further implementation, the shot list can be downloaded to a robotic device with an attached camera such as a robotic helicopter capable of hovering at precise 3D coordinates. The robotic device can then carry out capturing photographs for one or more of the cells.

Figure 5:
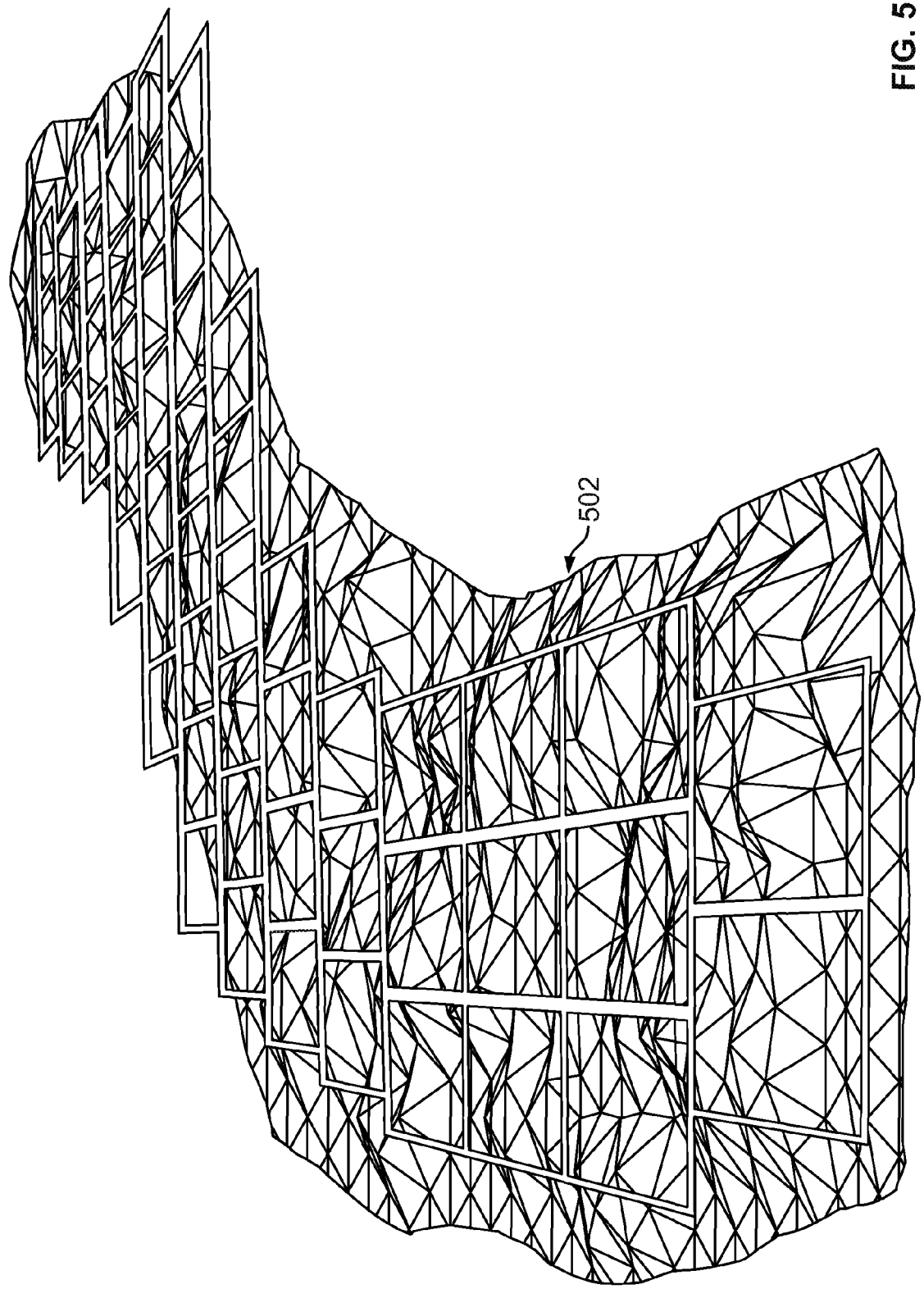
FIG. 5 is an illustration of 3D terrain data for a course, including a course grid overlay.

FIG. 5 is an illustration of 3D terrain data for a course, including a course grid overlay. A terrain represents elevation data for a course which provides a 3D digital elevation map (e.g., terrain mesh) of features on the course. The terrain is used by the game engine to simulate how virtual objects physically interact with the course and where the virtual objects appear in photographs of the course. Each cell (e.g., 502) maps to a portion of the course terrain. In one implementation, the digital elevation map is accurate to within a centimeter, however higher and lower resolutions are possible. Terrain data can be collected in a number of ways including, but not limited to, aerial photogrammetric mapping (APM), laser 3D imaging and GPS-real-time kinematic (GPS-RTK) surveys.

Figure 6A:
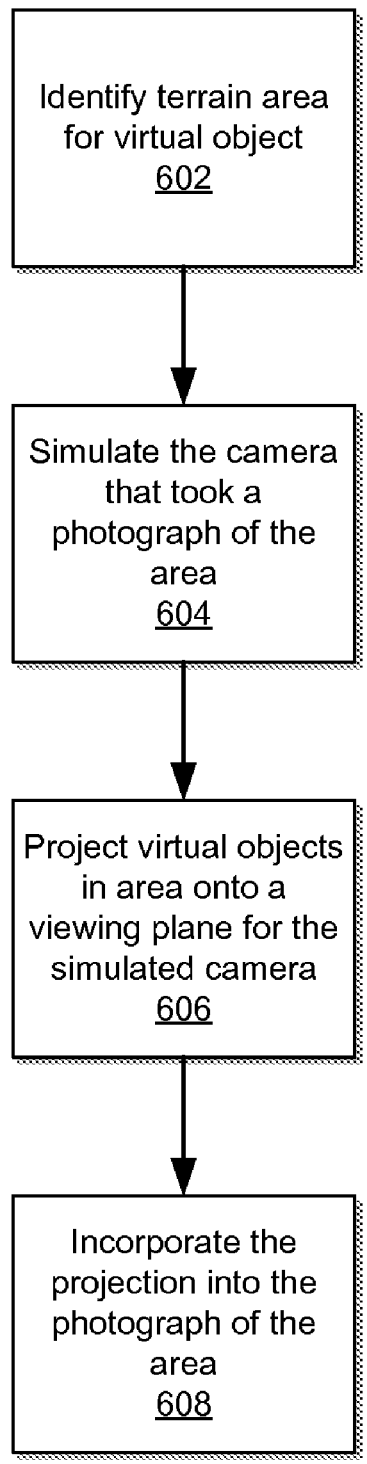
FIG. 6A is a flow diagram illustrating a technique for incorporating a visual representation of virtual objects into a photograph.
Figure 6B:
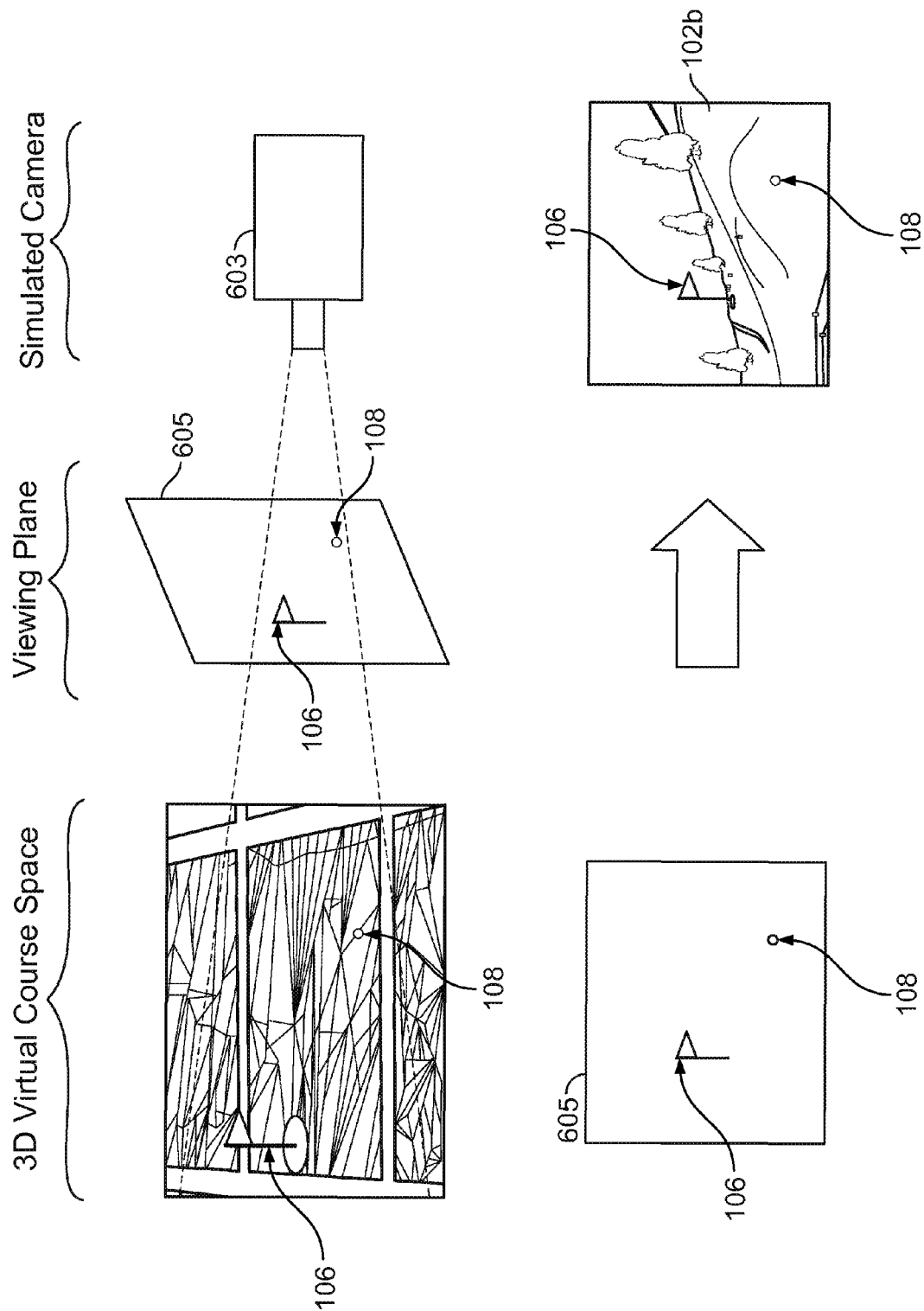
FIG. 6B is an illustration of 3D mapping.

FIG. 6A is a flow diagram illustrating a technique for incorporating a visual representation of virtual objects into a photograph. As described above, a game or simulation engine determines the location a tracked virtual object in 3D virtual course space (i.e., on or above the terrain). A terrain area in which the virtual object is located is identified (step 602). Next, the camera that took the photograph for the cell covering the terrain area is simulated (step 604). As shown in FIG. 6B, a virtual camera 603 simulates the exact view 605 of the actual camera based on known parameters of the camera (e.g., the 3D position of the camera, the angle and direction lens, and the focal length of the lens). Using a 3D perspective projection, the virtual object(s) (e.g., ball 108) in the 3D virtual course space are projected into the 2D viewing plane 605 of the simulated camera 603 (step 606). A perspective projection ensures that virtual objects that are farther from the virtual camera will appear smaller in relation to those that are closer to the virtual camera, thus adding to the sense of realism. In one implementation, the projection can compensate for visual distortion in the camera lens. The virtual objects in the 2D projection are then incorporated into the actual photograph of the cell (e.g., 102b; step 608). Additional virtual objects (e.g., avatars, virtual equipment) can also be dynamically included to the projection even though the position of these objects may not being used to trigger photographic mapping.

Figure 7:
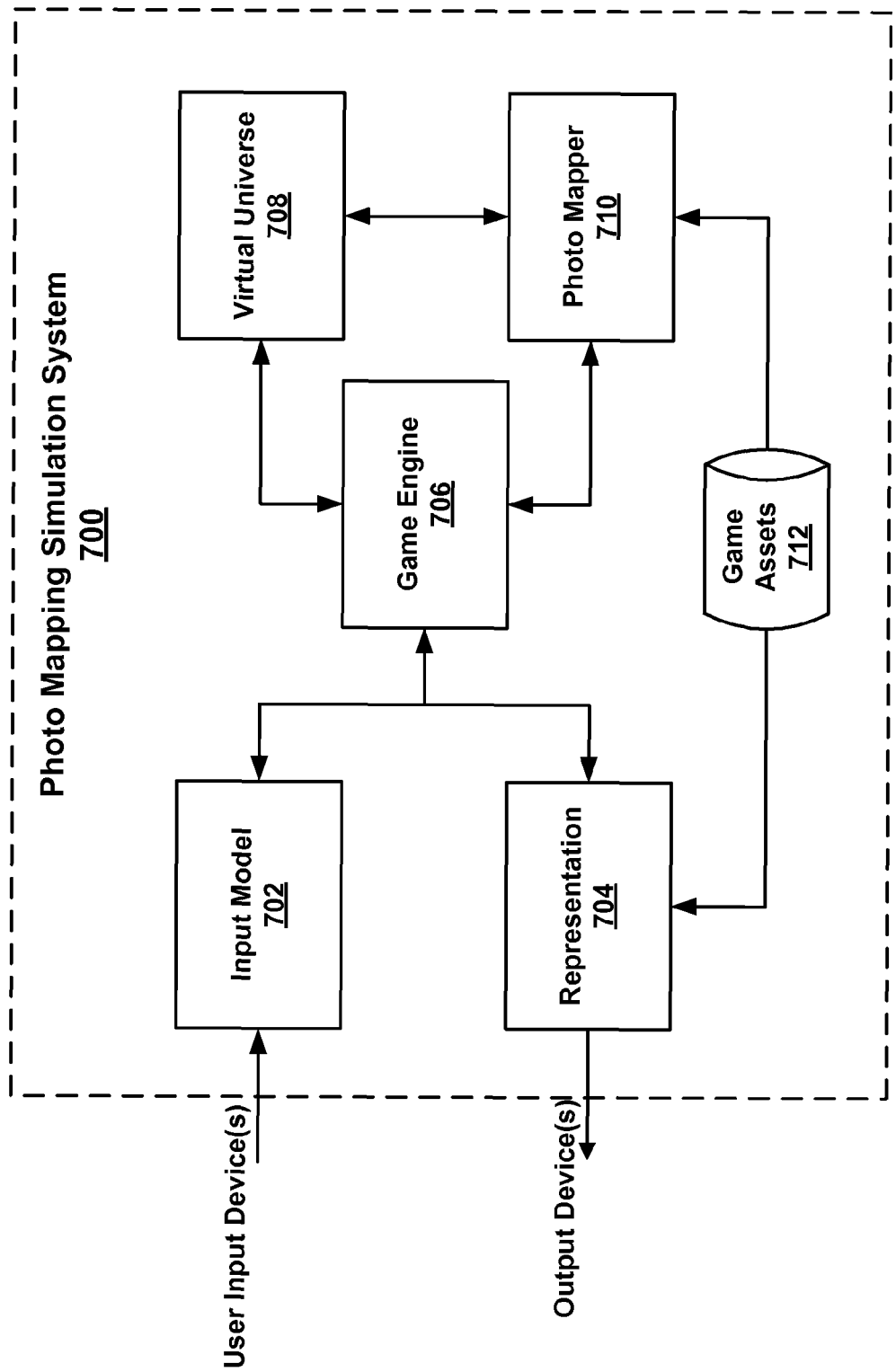
FIG. 7 illustrates a photographic mapping system.

FIG. 7 illustrates a photographic mapping system 700 for a computer game application or other simulation. The functionality encompassed in the system 700 can be distributed to fewer or more components than those illustrated. Moreover, components can be distributed to one or more devices that are capable of communicating over one or more commercial or proprietary networks or other communication interfaces. A game engine 706 maintains state for the virtual universe 708 based on user input and the interaction of objects in the virtual universe 708. An input model 702 maps user inputs (e.g., button presses, voice commands, sounds, gestures, eye movements, body movements, brain waves, other types of physiological sensors, and combinations of these) to one or more variable values or signals for processing by the game engine 706.

The game engine 706 can include a renderer for rendering views of the virtual universe that can be provided to the representation component 704 for presentation on a display device, for example. A representation component 704 receives audio/video rendering data from the game engine 706, and other rendering information including haptic data, and provides such to one or more output devices such as display devices, sound generation devices, haptic feedback devices, and other suitable devices.

The game engine 706 can include artificial intelligence capabilities for determining one or more future states of the virtual universe. The game engine 706 can also have the ability to simulate the physics of virtual objects interacting with a course terrain, for example. Virtual objects in the virtual universe 708 are associated with assets 712 (e.g., content, models, sounds, physics, artificial intelligence). Assets are used by the game engine 706 to represent virtual objects and render the computer game. Other assets include actual course photographs which are dynamically incorporated into the game GUI 100, as described above.

The game engine 706 employs a photographic mapping component 710 to identify photographs corresponding to the current location of game play and map one or more virtual objects from the 3D virtual course space into a viewing plane for incorporation into a photograph of the actual course. In one implementation, course photographs are tagged with data identifying the cell or course terrain region the photographs correspond to.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method, comprising:
   accessing a plurality of photographic images of a course, wherein the photographic images are obtained using an imaging device;
   determining a location for a virtual object on or above a course terrain for the course;
   identifying photographic images of the course corresponding to the location as the virtual object is tracked through the course via a photographic mapping component of a computer;
   determining a scale and position of the virtual object that correlate with the location within the presentation of at least one of the identified photographic images by projecting the virtual object onto a two-dimensional viewing plane using coordinates that were used to obtain the photographic images; and
   incorporating the virtual object in a presentation of the identified photographic images to show the virtual object at the position.

2. The method of claim 1, where determining the location includes simulating interaction of the virtual object with one or more portions of the course terrain.

3. The method of claim 2, further comprising incorporating a visual representation of the interaction in the presentation of the photographic image.

4. The method of claim 1, further comprising pre-fetching the photographic image based on a history associated with a user or a group of users.

5. The method of claim 1, further comprising accepting user input to cause interaction of the virtual object with one or more portions of the course terrain.

6. The method of claim 1, where the location is a first location and the photographic image is a first photographic image, the method further comprising:

in response to movement of the virtual object:

determining a second location for a virtual object on or above the course terrain for the course;

identifying a second photographic image of the course corresponding to the second location; and incorporating the virtual object in a presentation of the second photographic image such that the virtual object appears in the second photographic image.

7. The method of claim 1, where the location is a real-world location on the course.

8. The method of claim 1, further comprising incorporating an avatar or a piece of virtual equipment into the presentation of the photographic image.

9. The method of claim 1, further comprising incorporating the virtual object in a presentation of the photographic image such that the virtual object is animated in the photographic image.

10. The method of claim 1, further comprising incorporating a visual effect into the presentation of the photographic image.

11. The method of claim 1, where the course is one or more of: a golf course, a baseball diamond, a track, a tennis court, one or more roadways, or open terrain.

12. The method of claim 1, where the virtual object is one of: a golf ball, a baseball, a tennis ball, an automobile, a bicycle, an animal, an avatar, a motorcycle, or a flying craft.

13. The method of claim 1, where the photographic image is a composition of two or more photographs of the course.

14. The of method 1, where identifying the photographic image includes identifying a photograph from a plurality of photographs where a target location is nearest to the horizontal center of the photograph.

15. The method of claim 1, further comprising altering the terrain to account for distortion in the photographic image.

16. The method of claim 1, further comprising scaling the virtual object in the presentation of the photographic image.

17. The method of claim 1, where:

the course terrain represents a three dimensional space and the photographic image is a two dimensional image; and incorporating the virtual object into the presentation of the photographic image includes corresponding the location in the three dimensional space to a horizontal and vertical position in the two dimensional image.

18. A computer program product, encoded on a machine-readable non-transitory storage device, operable to cause data processing apparatus to perform operations comprising:

accessing a plurality of photographic images of a course obtained using an imaging device;

determining a location for a virtual object on a course terrain for the course;

identifying photographic images of the course corresponding to the location as the virtual object is tracked through the course;

determining a scale and position of the virtual object that correlate with the location within the presentation of at least one of the identified photographic images by projecting the virtual object onto a two-dimensional viewing plane using coordinates that were used to obtain the photographic images; and incorporating the virtual object in a presentation of the identified photographic images.

* * * * *